Oct. 17, 1939.　　　　H. R. BERNDT　　　　2,176,783
SLED
Filed April 18, 1938
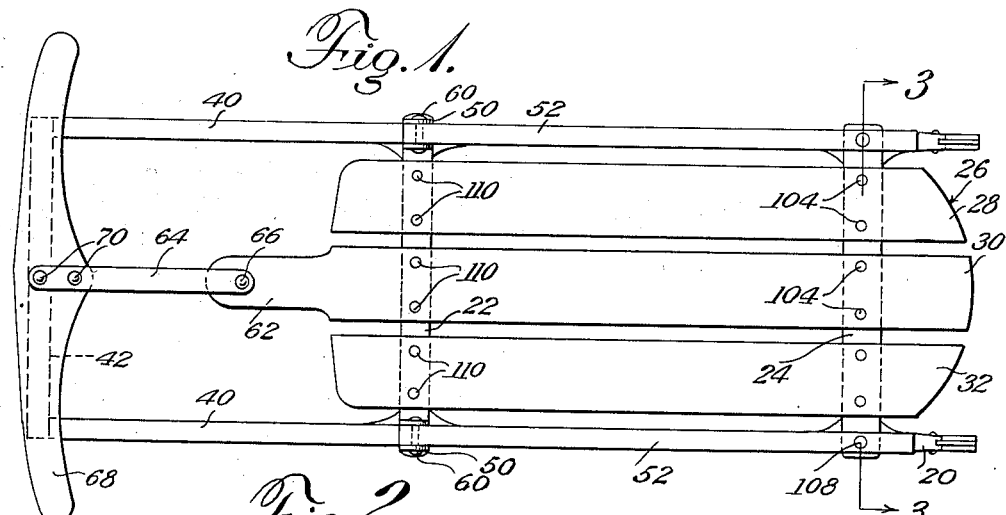
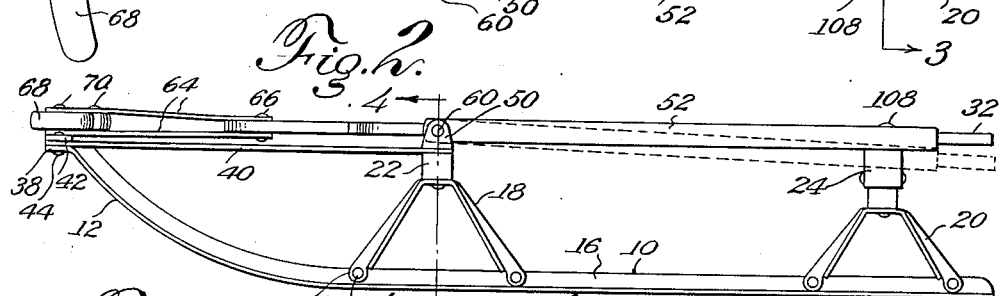
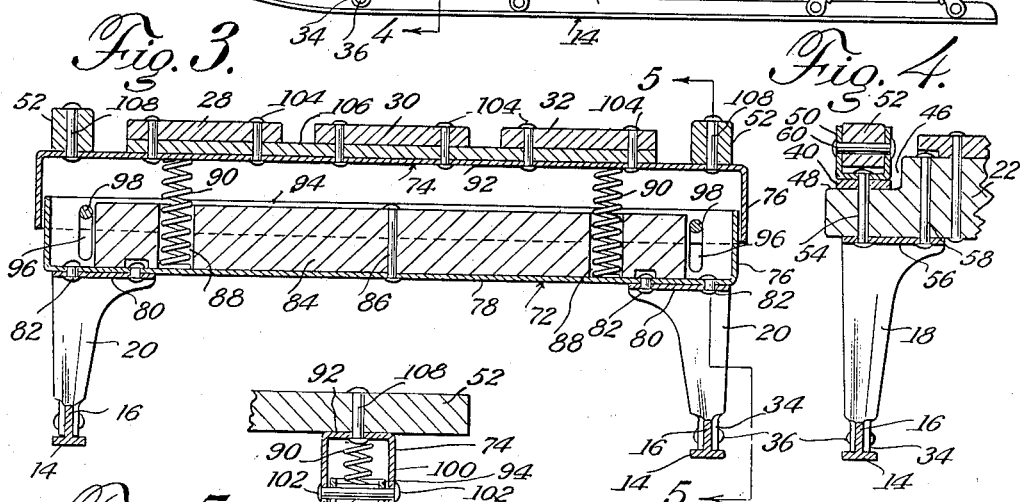
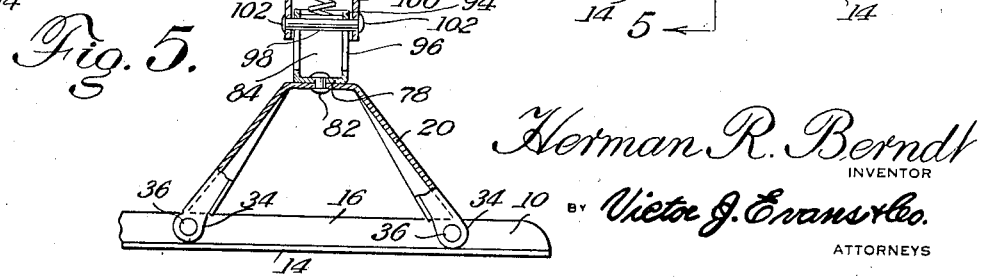
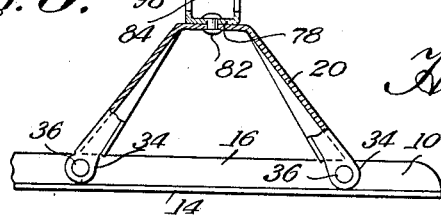
Herman R. Berndt
INVENTOR
BY Victor J. Evans & Co.
ATTORNEYS Patented Oct. 17, 1939

2,176,783

UNITED STATES PATENT OFFICE 2,176,783

SLED

Herman R. Berndt, Rhinelander, Wis.

Application April 18, 1938, Serial No. 202,726

3 Claims. (Cl. 280—25)

My invention relates to sleds of the type employed for coasting and amusement purposes and includes among its objects and advantages the provision of an improved shock absorbing seat or load carrying platform.

The present invention relates to a sled of the type disclosed in my Patent 1,405,262 wherein springs are associated with the rear beam for resiliently supporting the same. The seat or platform is mounted on the beam, and the springs associated with the latter constitute shock absorbing means for the seat or platform. The resilient mounting acts as a cushioning device for shocks incident to travel of the sled over rough places or when the sled is thrown on a hillside or slide with the user falling thereon. In my prior patent, the springs are mounted exteriorly of the beam. In the present invention, I make use of a resilient beam comprising a housing made up of two sections movably related with the springs housed inside the sections so as to enclose the springs and fastening devices in such a manner as to eliminate any danger of pinching of or injury to the user. At the same time, the cushioning feature is so arranged as to provide an exceedingly compact structure as well as one in which the parts are so related as to provide a pleasing appearance.

In the accompanying drawing:

Fig. 1 is a top plan view of a sled embodying my invention;

Fig. 2 is a side elevational view;

Fig. 3 is an enlarged sectional view along the line 3—3 of Fig. 1;

Fig. 4 is an enlarged sectional view along the line 4—4 of Fig. 2; and

Fig. 5 is an enlarged sectional view along the line 5—5 of Fig. 3.

In the embodiment selected to illustrate my invention, the sled comprises the usual metallic runners 10, each of which is bent upwardly at 12 in the usual manner. These runners are preferably T-shaped in cross section, as indicated in Figs. 2 and 3, with the T's inverted to provide bearing surfaces 14 and reinforcing flanges 16. To the flange 16 of each runner I connect a front beam supporting bracket 18 and a rear beam supporting bracket 20. Upon the bracket 18 I mount a beam 22 and upon the bracket 20 I mount a resilient beam 24. Beams 22 and 24 support a platform or seat 26 made up of slats 28, 30 and 32. According to Figs. 3, 4 and 5, the brackets 18 and 20 are formed of sheet metal and their lower ends are shaped to provide ears 34 between which the flanges 16 are pressed, and the two parts fixedly connected by rivets 36.

At the forward end of the runners 12 I provide lips 38 which support the forward ends of straps 40 upon the forward ends of which I mount a cross bar 42. The ends of the bar 42, the forward ends of the straps 40 and the lips 38 are connected into a unitary structure by rivets 44. Referring to Fig. 4, the beam 22 may comprise wood and is recessed at 46 to provide a ledge 48 upon which the rear ends of the straps 40 are mounted. Upon these ends of the straps 40 I mount U-shaped brackets 50 between the legs of which I position the forward ends of handle bars 52. Rivets 54 pass through the bights 56 of the brackets 18, the beam 22, straps 40 and the bights of the U-shaped brackets 50 for connecting all the parts into a unitary structure.

Bights 56 are made additionally secure by rivets 58. The forward ends of the handle bars 52 are pivotally connected between the U-shaped brackets 50 by rivets 60. Slat 30 is extended at 62 and is connected with two straps 64 by a rivet 66. The forward ends of the straps 64 are connected with a transverse bar or handles 68 by rivets 70. In Figs. 3 and 5, the rear beam 24 comprises a U-shaped housing 72 and an inverted U-shaped housing 74, each of which is provided with end walls 76. Housing 74 partly encloses the housing 72 with the wall surfaces of the two housings snugly related to prevent relative endwise or transverse movement. However, the housings are freely related to permit relative vertical movement. The bight 78 of the housing 72 is securely fastened to the bights 80 of the brackets 20 by rivets 82.

Within the housing 72 I mount a wooden bar 84 which may be made secure by a rivet 86 and which is provided with two bores 88 for the reception of coil springs 90. Bight 78 supports the lower ends of the springs 90 while their upper ends have pressure relation with the bight 92 of the housing 74. In the side walls 94 of the housing 72 I provide vertical slots 96 through which pins 98 extend. These pins pass through openings in the side walls 100 in the housing 74, and their ends may be riveted, as at 102, for fixedly connecting the pins with the housing. With the housing 74 positioned according to Figs. 3 and 5, pins 98 lie adjacent the inner ends of the slots 96 so as to restrain the housings 72 and 74 from further separation. In these figures, the housings are illustrated in their normal positions, at which time the springs 90 are under compression. The rear ends of the slots 28, 30 and 32 are fixedly anchored to the bight 92 of the housing 74 by rivets 104. A spacer 106 may be interposed between the slats and the bight 76 to bring the seat or platform 26 into a plane paralleling the top plane of the sled as a whole. Rivets 108 fixedly connect the rear ends of the handle bars 52 with the bight 92 of the housing 74.

From the foregoing description of the various parts of the device, the operation thereof will be readily understood. The tension of the springs 90 is such as to support the seat or platform 26 in the normal position of Fig. 2 in the absence of a load. Housing 74 may be depressed relatively to the housing 72 against the tension of the springs 90 when loaded or in response to shocks incident to rough surfaces or by the user when falling or jumping upon the sled, as when coasting. Slots 96 are of sufficient length to permit free downward movement of the pins 98 as the housing 74 is depressed. The tension of the springs 90 is such as to absorb shocks incident to rough surfaces or falling of the user upon the platform, thus embodying a cushioning effect. The bar 84 constitutes a support for the springs so as to hold them in an upright position, but the bores 88 are of such diameter as to permit free compression of the springs. As the springs 90 are compressed, the rear end of the seat or platform 26 moves in the direction of the dotted line illustration of Fig. 2. While the forward ends of the slats 28, 30 and 32 are fixedly connected with the beam 22 by rivets 110, such slats are sufficiently resilient to bend easily. While the handle bars 52 are rigid, their forward ends are pivotally connected between the U-shaped brackets 50 so as not to resist yielding of the seat or platform under shocks transmitted thereto.

The beam 24 in addition to functioning as cushioning means embodies a relatively compact arrangement and one in which the nesting of the housings 72 and 74 prevents relative movement in endwise or lateral directions. When connected, the pins 98 prevent complete separation. At the same time, the springs are completely enclosed so as to embody a protective function. While I have illustrated the sled as being provided with a resilient rear beam only, it is obvious that both beams could embody the cushioning feature.

Without further elaboration, the foregoing will so fully explain my invention that others may, by applying current knowledge, readily adapt the same for use under various conditions of service.

I claim:

1. In a sled including runners, a platform, beam means connected with the runners for supporting the forward end of the platform, a resilient beam interposed between the runners and the rear end of the platform, rigid handle bars pivotally connected at the forward ends with said first beam means and fixedly connected with said resilient beam means.

2. In a sled, a beam comprising a lower U-shaped housing, an upper inverted U-shaped housing telescopically related to the first housing, a coil spring interposed between the bights of the two housings, and a bored body located inside the first housing, the bore of said body housing one end of the coil spring, to prevent lateral displacement thereof.

3. In a sled, a beam comprising a lower U-shaped housing, an upper inverted U-shaped housing telescopically related to the first housing, coil springs interposed between the bights of the two housings, and a bored body located inside the first housing, the bore of said body housing one end of the coil springs, to prevent lateral displacement thereof.

HERMAN R. BERNDT.